United States Patent [19]

Höppner et al.

[11] 4,324,045
[45] Apr. 13, 1982

[54] MOTOR CHAIN SAW WITH DYNAMIC SAFETY BRAKING DEVICE

[75] Inventors: Klaus Höppner, Marbach; Günter Wolf, Murrhardt, both of Fed. Rep. of Germany

[73] Assignee: Firma Andreas Stihl, Waiblingen, Fed. Rep. of Germany

[21] Appl. No.: 154,534

[22] Filed: May 29, 1980

[30] Foreign Application Priority Data

Jun. 2, 1979 [DE] Fed. Rep. of Germany ....... 2922574

[51] Int. Cl.³ .............................................. B27B 17/02
[52] U.S. Cl. ........................................ 30/381; 30/383
[58] Field of Search ................. 30/382, 383, 384, 381; 188/77 R, 166

[56] References Cited

U.S. PATENT DOCUMENTS 3,991,469 11/1976 Frederickson ...................... 30/383
4,091,896 5/1978 Wieland ........................... 188/77 R
4,121,339 10/1978 Nikolich ......................... 30/383 X Primary Examiner—Jimmy C. Peters
Attorney, Agent, or Firm—Becker & Becker, Inc.

[57] ABSTRACT

A portable motor chain saw with a safety braking device to protect against kick-back, recoil or centrifugal movements of the saw. The saw includes a handle supported against the motor housing by damping elements, and also includes a locking device which on the one hand is connected with the handle, and on the other hand engages against a hand guard in such a way that it is released under the influence of relative movement, of the motor housing with respect to the handle, caused by a kick-back or centrifugal movement, consequently releasing the hand guard. The locking device has an abutment surface extending transverse to the direction of centrifugal movement, and this abutment surface cooperates with a projection directed against it.

9 Claims, 9 Drawing Figures

MOTOR CHAIN SAW WITH DYNAMIC SAFETY BRAKING DEVICE

The present invention relates to a portable motor chain saw with a safety braking device that protects against centrifugal, kick-back, or recoil movements. The saw also has a handle and a hand guard which acts as an inertia mass and is arranged between the handle and the saw chain. The hand guard is pivotably journalled on the motor housing about an axis which extends substantially parallel to the drive wheel or gear.

There is already known a portable motor chain saw with which the safety brake can be released during a certain relative movement of the handle housing and the motor housing, with respect to each other, by way of an adjustable pin, which is arranged on the handle of the machine, without the saw executing any recoil or centrifugal movement. Such movement can have a disturbing effect when sawing, especially when strongly pressing the saw into engagement.

With another known motor saw, for actuating and releasing the brake there is used the inertia and clamping effect of a pivotal mass embodied as a hand guard lever which, during a recoil or centrifugal movement of the saw, lags behind the pivot movement of the motor housing and then releases a locking device with which a brake band or a brake wire is held in a non-braking position as long as no recoil or centrifugal movement occurs.

The functioning of this known device, however, depends essentially on whether the mass actually moves during a recoil or whether the movement is prevented by the accumulation of dirt or freezing of the brake block due to moisture and cold, causing the inertia mass to clamp or bind.

The object of the present invention is to create a safety device, for portable chain saws, with which the chain saw, in every position of the machine during a recoil, can be safely stopped by means of a release device immediately after a recoil, and consequently the danger of accidents can be considerably reduced.

This object, and other objects and advantages of the present invention, will appear more clearly from the following specification in connection with the accompanying drawings, in which.

Figure 1:
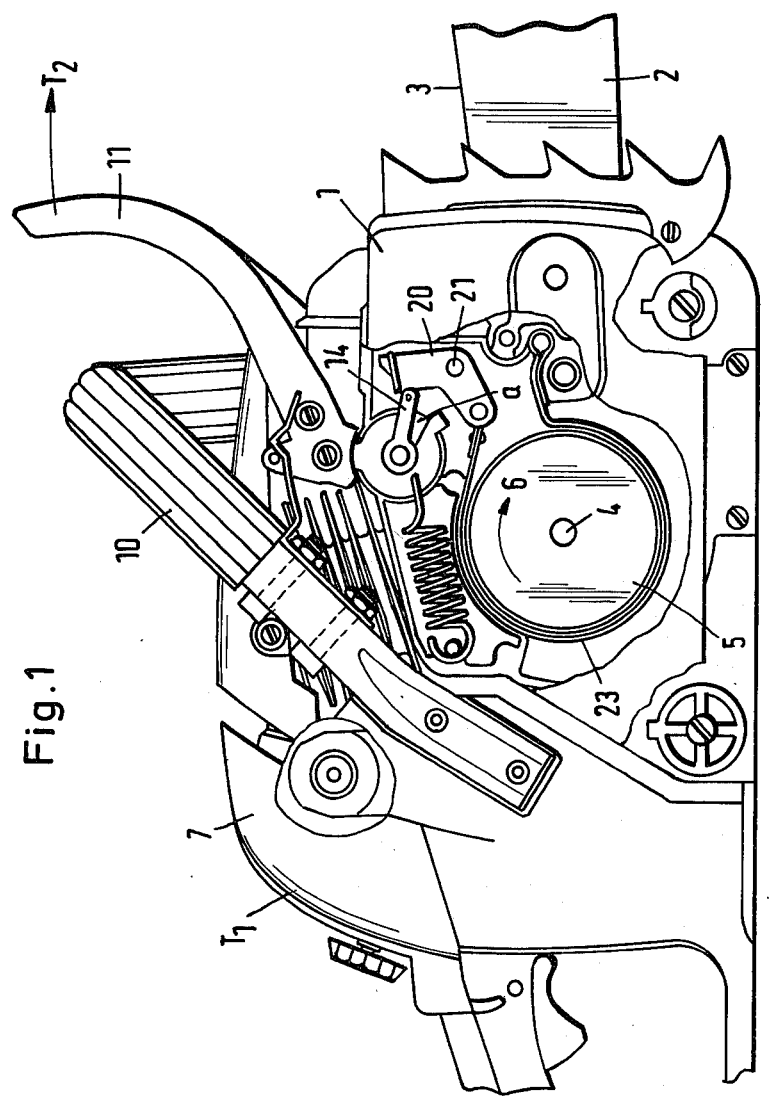
FIG. 1 shows a portable chain saw with a dynamically responding safety braking device according to the present invention as illustrated in a side view and partially in section in the ineffective braking position of the braking device.

The chain saw of the present invention is characterized primarily in that:

(a) the handle is supported against the motor housing by spring means; and (b) a locking device is connected, on the one hand, with the handle and, on the other hand, engages the hand guard in such a way that it is released under the influence of a relative movement, of the motor housing with respect to the handle, caused by the centrifugal motion, consequently releasing the hand guard.

With the present invention, two separate, independent inertia systems are created: By way of the inertia of the handle housing and the motor housing, which are connected with each other in an oscillation-damping manner, and, as a consequence thereof carry out a movement relative to each other upon the occurrence of a recoil or centrifugal movement of the saw; and by the second inertia mass formed by the hand guard, which during recoil of the saw attains a certain inertia magnitude. The arrangement is inventively so provided that, during a recoil of the saw, the brake is released only by the cooperation of both inertia systems.

Pursuant to further features of the present invention, the locking device may have an abutment surface which extends transverse to the kick-back or centifugal movement, and cooperates with a projection directed against it. The abutment surface and/or the projection may be embodied in a spring-elastic manner. The abutment surface may be bent off from a leafspring which is secured to the handle. The projection may be formed by an abutment pin which extends parallel to the turning or pivot axis of the hand guard and is secured to a carrier connected with the hand guard. The carrier of the abutment pin may be embodied in a spring-elastic, especially rubber elastic, manner. The leafspring may have longitudinal or elongated holes on that section thereof serving for connection with the handle; these elongated holes serve for adjusting the position of the abutment surface with respect to the abutment pin, and for adjusting the spring preloading of the free end section of the leafspring.

A downwardly inclined back surface may adjoin the inclined abutment surface, by way of a roof-shaped intermediate zone, in a direction toward the free end section of the leafspring; during pivoting back of the finger guard out of the braking release position into the non-braking ready position, the projection glides along this back surface under tension of the leafspring. The handle may be arranged on a handle housing, which in turn is supported on the motor housing, for example by means of rubber-elastic damping means.

Referring now to the drawings in detail, the portable motor chain saw illustrated in FIGS. 1-4 inclusive has as base element a motor housing 1 which serves as a carrying or supporting frame for a saw blade or tongue 2 with an endless saw chain 3 circulating thereon, as well as for an internal combustion engine, not illustrated in detail, serving as a drive motor for the saw chain.

Figure 2:
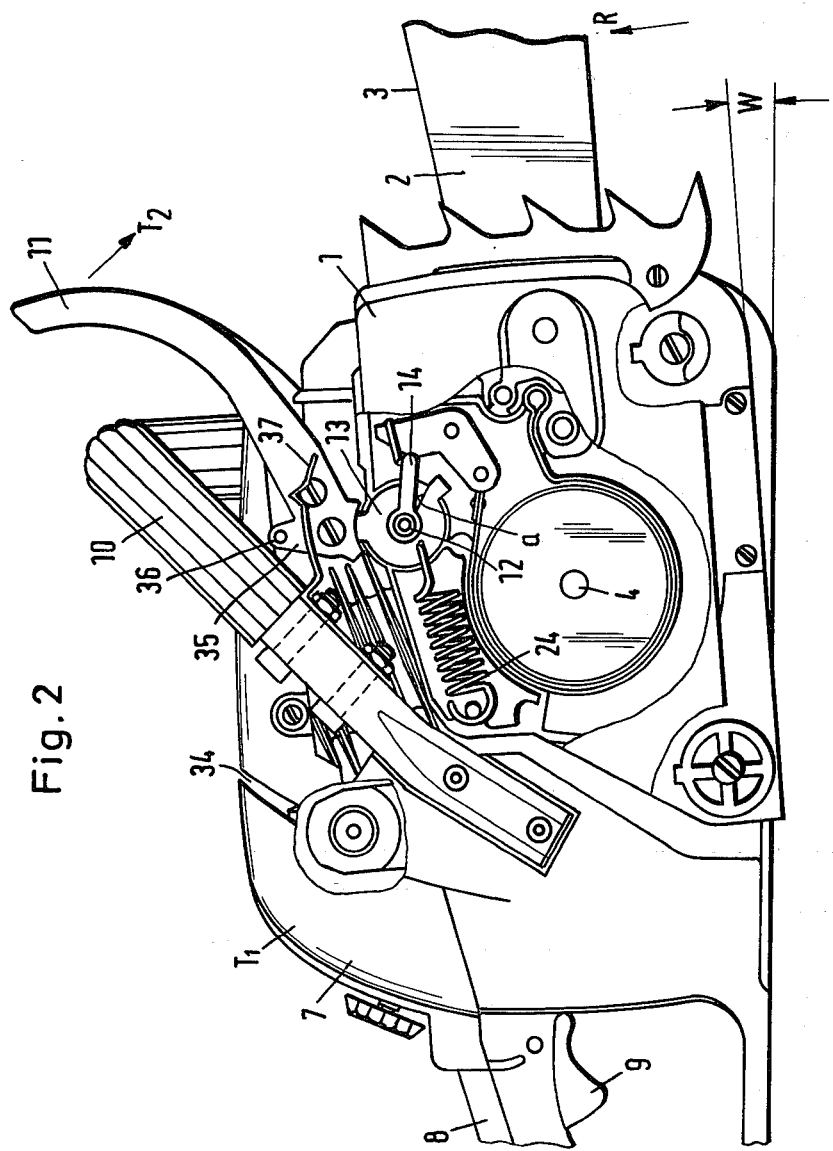
FIG. 2 shows a portable chain saw of FIG. 1 in a position directly before release of the safety braking device when a centrifugal movement of the saw has already occurred.
Figure 3:
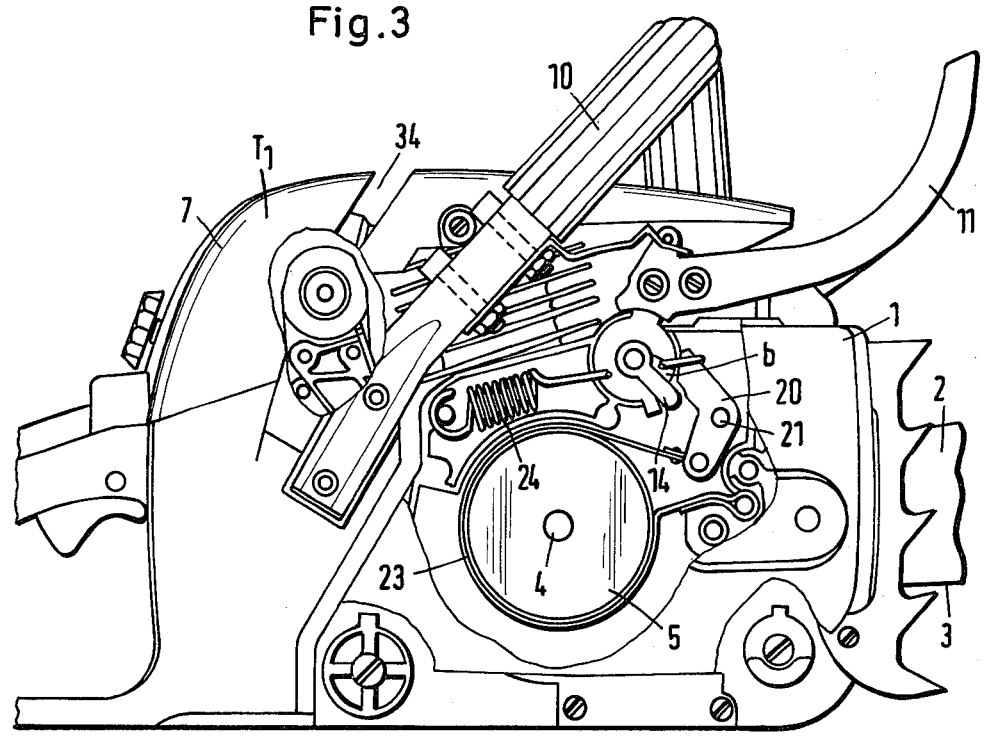
FIG. 3 shows the portable chain saw in the braking position of the safety braking device.

The crank shaft 4 of the internal combustion engine is arranged at right angles with regard to the cutting plane determined by the saw tongue 2 (FIGS. 1-3). Also, a clutch or coupling drum 5 of a centrifugal weight clutch is rotatably journalled in the motor housing 1. By means of the centrifugal weights (not shown in the drawings), rotatable with and connected to the crank shaft 4 of the internal combustion engine, the drum 5 comes into positive connection with the crank shaft when the speed of the internal combustion engine is increased above its idling speed to a working speed, for example, of more than 1000 rpm. In the engaged condition of the centrifugal clutch, the saw chain 3, via a non-illustrated drive gear fastened to the outside of the clutch drum 5, is driven by the clutch drum 5, which rotates in the direction of the arrow 6.

In order to be able to bring and hold the saw in the correct position with respect to the material to be cut, for instance a tree trunk or a branch to be cut off, a handle housing 7, rigid in itself, is provided onto which a handle (see 8 of FIG. 2) is formed which has inserted therein the control elements 9 for the internal combustion engine. The handle housing 7 has a front handle 10 screwed securely thereto. The middle portion of this handle 10 extends transverse to the cutting plane of the saw chain 3 in such a manner that the motor chain saw can be carried singlehandedly by means of this handle and, in the vertical cutting position of the saw as shown in FIGS. 1–3, can be held above the center of gravity (not indicated in the drawing) which is located approximately in the region of the crank shaft 4.

Because of the danger that during sawing, for example during the removal of branches from a tree, the saw chain 3 may bind or get tangled and a kick-back or centrifugal movement directed against the operator may result, accompanied by considerable danger of accident or injury, the illustrated motor chain saw is equipped with a safety braking device which is described in further detail in the following paragraphs.

The safety braking device is to stop the saw chain as quickly as possible, or at least bring about a braking to a speed which is no longer dangerous, when the accelleration at such a kick-back exceeds a set value.

A hand or finger guard 11 is associated with the safety braking device. Between the handle 10 and the saw chain 3, this guard yoke 11 is pivotally journalled on the motor housing 1 about an axis extending parallel to the motor axis 4 and formed by a pin or stud 12; this guard 11 has the effect of an inertial mass in the manner described in greater detail in the following statements. The finger guard 11 is screwed to a finger guard lever 13 which is rotatable on the pin or stud 12. This lever 13 surrounds a drag lever 14 with rotary play on both sides, indicated in FIGS. 1 and 2 at a, and in FIG. 3 at b; this drag lever 14 is likewise rotatably journalled on the pin 12. Between the drag lever 14 and the guard lever 13, there is provided a rotatable coil spring which is coaxial with respect to the pin 12 and is not illustrated in detail; this spring holds the drag lever 14, in the undisturbed operating position shown in FIG. 1, against the guard lever 13 under such tension that the upper rotary play b is eliminated and the drag lever 14 with its curved end face 15, recognizable better in FIG. 5, engages in a concave recess 16 which serves as notch or arresting means, and is provided in the narrow longitudinal edge 17 of a first arm 18. This arm 18, together with a second arm 19, forms an angular lever 20 which is pivotally journalled on a pin 21 secured to the housing. A free end section of a flat brake band 23 is fastened to the second arm 19. The brake band 23 passes over approximately 280° of the outer mantle surface of the clutch drum 5, which simultaneously serves as brake drum; in the non-braking position, the brake band 23 has a slight radial play with regard to the brake drum 5.

Figure 5:
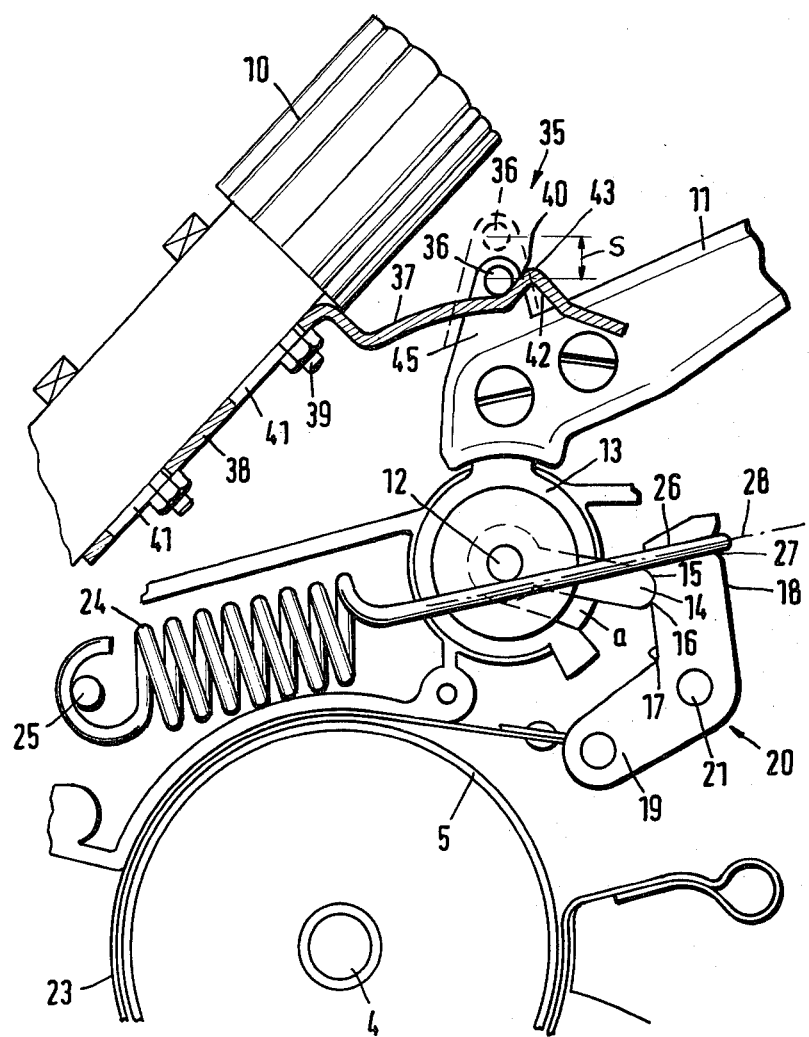
FIG. 5 shows on a larger scale the release device, coupled with the hand guard of the chain saw, in the operating position, i.e., in the non-braking position.

The brake band 23 is illustrated in FIG. 3 in the braking position, in which the angular lever 20 is released from its arresting or locking condition by the drag lever 14 and, by means of a preloaded coil spring 24, effective as an accumulator, is pivoted counterclockwise and consequently presses the brake band 23 against the brake drum 5. As shown in FIG. 5, one of the two ends of the coil spring 24 is pushed over a pin 25 secured to the housing, and its other end 26 is suspended in a semicircular groove 27. This groove 27 is located on the back of the first arm 18 of the angular lever 20 facing away from the drag lever 14. The tension or pulling force of the coil spring 24 (indicated by a dot-dash line 28 in FIG. 5) extends, not only in the braking position according to FIG. 3, but also in the operating and ready positions of FIGS. 1 and 2, closely below the turning axis, formed by the pin 12, of the hand guard lever 13 or the finger guard 11. Stable force conditions are created on the angular lever 20 by the foregoing relationship.

Provision is made such that the handle housing 7 relative to the motor housing 1 be effective as the first inertial magnitude T-1, and the mass of the finger guard 11 be effective as the second inertia magnitude T-2, so that the releasing device, comprising the angular lever 20, the drag lever 14, and the hand guard lever 13, can relieve the spring 24 for initiating a braking procedure when the energy of an occurring recoil or kick-back exceeds a preset, relatively low value.

Figure 4:
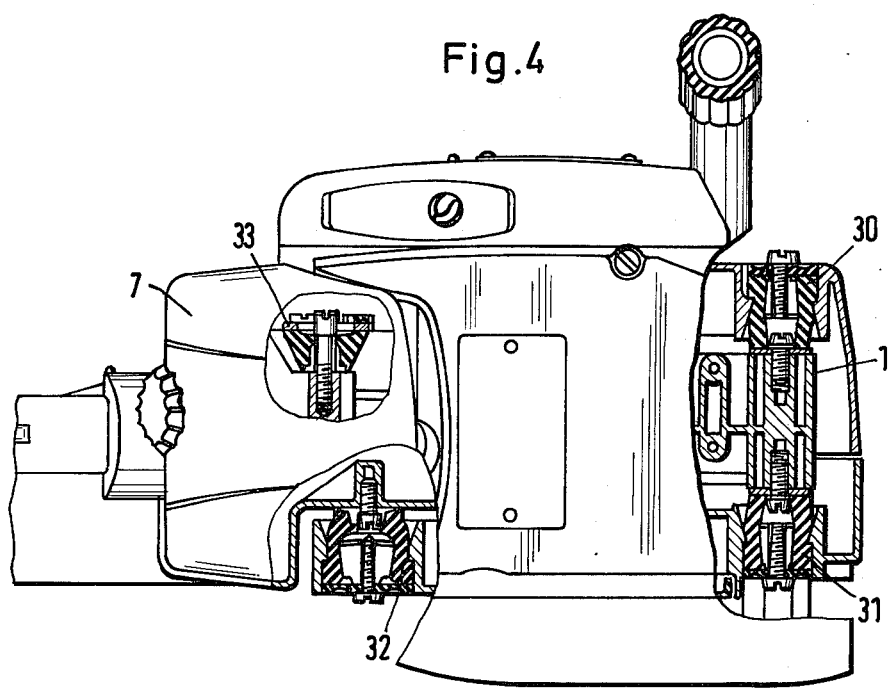
FIG. 4 shows a cutout of the motor chain saw in a top view and partially in section.

In detail, for attaining the first inertia magnitude T-1, the handle housing 7 is elastically supported by soft rubber elements 30, 31, 32 and 33 in a manner better recognizable from FIG. 4. By this arrangement, there is created not only a very effective anti-vibration system by which unavoidable vibrations which come from the saw chain are damped, but there is also made possible a utilization of the recoil or kick-back for releasing the safety braking device. When a recoil occurs, the motor housing 1 can pivot in the direction of the arrow R (FIG. 2) relative to the handle 10 or the handle housing 7 about an angle W while tensioning the rubber elements 30 to 33, whereby the air gap 34 between the handle housing 7 and the motor housing 1 is clearly reduced, as recognizable in FIG. 2.

A locking or arresting device 35 is additionally provided between the handle housing 7, or the handle 10 rigidly connected therewith, and the finger guard 11; the locking device 35, on the one hand, is connected with the handle housing 7 and, on the other hand, engages the finger guard 11. In detail, the locking device 35 comprises a striker or abutment pin 36, which is connected with the finger guard 11 and extends parallel to the finger guard turning axis formed by the pin 12. The locking device 35 further comprises a coulisse-like or guide-like bent leafspring 37, the flat end section 38 of which is fastened by means of two screws 39 to the handle 10 (FIG. 5). In the operating position and ready position illustrated in FIG. 5, the abutment pin 36 engages an inclined arresting surface 40, which protrudes against the pin; this arresting surface 40 is bent upwardly out of the leafspring 37 and, in the illustrated position, engages with slight preloading against the abutment pin 36.

If an operator wants to release the brake statically, without any kick-back or recoil occurring, by grasping the finger guard 11 and pressing it downwardly in a rotating manner to the right as must be done for T-2, then the releasing force $F_H$ is composed of the friction force between the drag lever 14 and the angular lever 20, as well as the friction force between the leafspring 37 and the abutment pin 36; this second friction force can be adjusted or set by shifting the leafspring in its oblong holes 41.

If, however, a kick-back or recoil occurs and the motor housing 1 moves upwardly by an angle W in the direction of the arrow R as indicated in FIG. 2, the abutment pin 36, which together with the motor housing 1 and the guard 11 moves upwardly, traverses an adjustment path indicated by "s" in FIG. 5 as a consequence of this relative bending movement directed against the handle housing 7; thus, the abutment pin 36 releases itself from the arresting surface 40 of the leafspring, so that the finger guard 11, acting as an inertial mass, can move downwardly as a second inertia magnitude T-2 unhindered by the spring, and hereby can release the safety braking device. During the release operation, the finger guard 11 presses the drag lever 14 out of its arresting recess 16 on the angular lever 20, so that the spring 24 can tension the brake band 23, which can then brake the drum 5. The driving force between the drag lever 14 and the angular lever 20 is chosen such that during a recoil or kick-back, the relatively small inertia mass of the guard 11 is sufficient to bring about a safe braking action of the brake with the accelleration occurring during the kick-back. The arrangement can be readily so designed that, during freeing of the abutment pin 36 without kick-back, the brake cannot be released; instead, first the upper rotary play b between the drag lever 14 and the hand guard lever 13 must be overcome.

During tensioning of the brake, the abutment pin 36 presses against the inclined back surface 42 and slides thereon over the roof-like intermediate section 43 until it reaches the arresting surface 40 and, in this arresting position, presses the leafspring 37 elastically downwardly.

As a consequence of the division into a first inertia magnitude T-1, formed by the handle housing 7 and the motor housing coupled therewith by means of the rubber elastic elements, and into the second inertia magnitude T-2, comprising the mass of the protective guard 11, there is achieved in the inventive arrangement that already a relatively small, though accurately adjustable kick-back impulse is sufficient to release the safety braking device, whereas for a static release by pressure on the finger guard 11, a considerably greater torque is necessary, because with a static release, the leafspring 37 exerts a counter effect with its arresting surface 40 and the abutment pin by friction and positive engagement.

In a reversal of the embodiment of the locking device 35 illustrated in FIG. 5, in place of the leafspring 37, a rigid coulisse or guide can be secured to the handle housing 7 or to the carrier handle 10; the abutment pin 36 can be resiliently embodied or can be supported as a spring-elastic projection; and/or a spring-elastic carrier 45, formed for example by a soft rubber piece, can be provided for the abutment pin 36.

FIGS. 6 and 7, and FIGS. 8 and 9, respectively, illustrate two further embodiments for a release device modified with respect to FIG. 5. Such modified releasing devices have the advantage that they are less sensitive to frictional influences, and accordingly make possible a still more accurate setting or adjustment of the mass inertia moment, of the finger guard 11, leading to the releasing operation.

In the following description, identical parts, or structural parts having the same effect, are provided with the same reference numerals as in FIGS. 1 through 5, but with primes being added where necessary.

Figure 6:
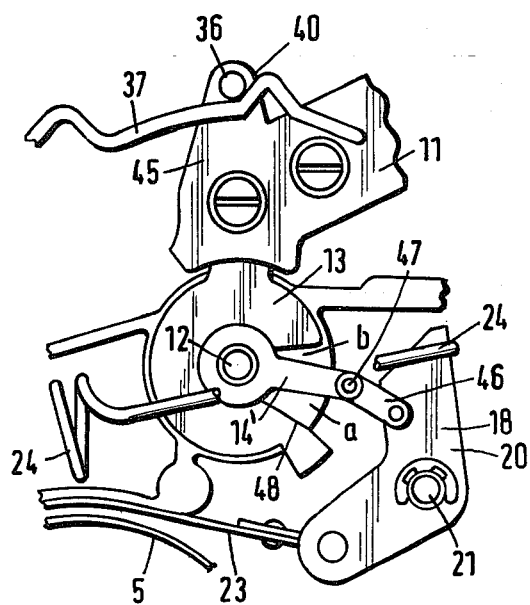
FIG. 6 shows another release device in its operating position.
Figure 7:
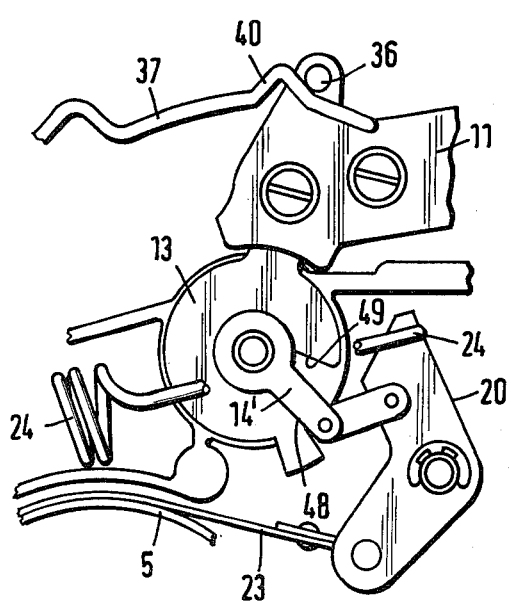
FIG. 7 shows the release device of FIG. 6 in the braking position.

With the embodiment according to FIGS. 6 and 7, an elbow-lever principle is used for arresting the angular lever 20. In this embodiment, at the free end of the drag lever 14', there is pivotally journalled a support part 46, which is likewise pivotally linked at the upper arm 18 of the angular lever 20; thus, the support part 46 forms with the drag lever 14 an elbow in the release position of the brake band 23 illustrated in FIG. 6. The linkage axis serving for connection of the drag lever 14 with the support part 46 is designated with the reference numeral 47. When the finger guard 11 is pivoted counterclockwise against the handle 10 for attaining a new ready positioning of the safety braking device in the manner illustrated in FIG. 3, the hand guard lever 13, as soon as the lower rotary play a has been overcome, with its lower abutment edge 48, during its rotary movement, takes along the drag lever 14 so far upwardly that the extended position of the drag lever 14 and of the support part 46 is exceeded. At this point, the drag lever 14 forms with the support part 46 a downwardly open angle which is only slightly less than 180°. With the illustrated embodiment, this angle is approximately 165° to 170°. Under the pull of the coil spring 24, there results a stable arresting position between the drag lever 14 and the angular lever 20 when, in the manner known with elbow levers, by abutments (not shown in the drawings) effective relative to each other, the opening angle is prevented from assuming smaller values, and the elbow linkage is prevented from breaking away upwardly.

When for a dynamic release of the safety braking device, the finger guard 11, together with the hand guard lever 13, is pivoted under the influence of the mass inertia moment of the hand guard lever and can turn freely during the recoil, the upper abutment edge 49 (FIG. 7) of the hand guard lever 13 engages the drag lever 14 and presses it downwardly while overcoming the pressure point reached in the extended position, so that the coil spring 24 can relax and can thereby pivot or swing the angular lever 20 into the braking position illustrated in FIG. 7. In this position, the angular lever 20 brings the brake band 23 into taut engagement upon the peripheral surface of the brake and clutch drum, thus effecting the braking procedure.

Figure 8:
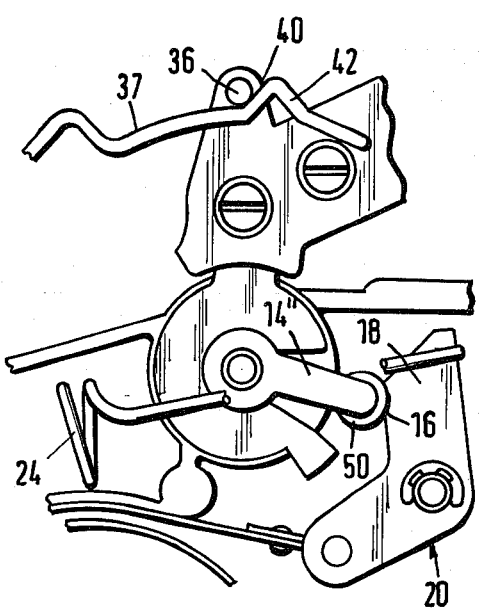
FIG. 8 shows a third release device in the operating position.
Figure 9:
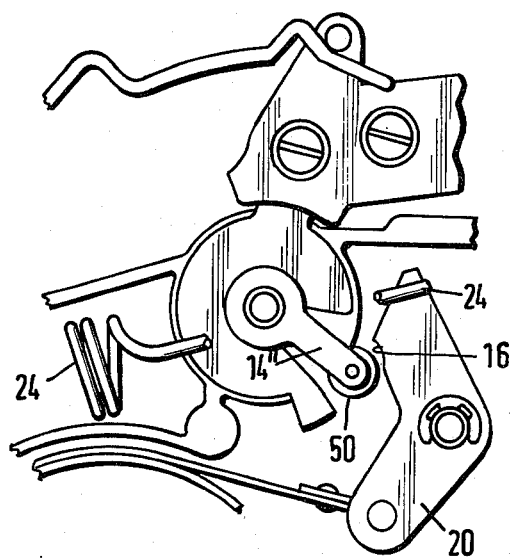
FIG. 9 shows the third release device in its braking position.

With the embodiment illustrated in FIGS. 8 and 9, a support roller 50 is rotatably journalled at the free end section of the drag lever 14. This roller is to engage in the concave recess 16 on the upper arm of the angular lever 20, and by way of the arresting or latching resulting therewith, assures the ready position of the safety braking device. The outer diameter of the support roller 50 can be slightly more than twice as large as the radius with which the recess 16 is formed. The support roller 50, together with the recess 16 and the tensioning of the coil spring 24, determines that mass inertial moment at which the safety braking device is released, whereby the special advantage results that the mass inertial moment necessary for a dynamic release is defined very accurately and lies essentially below that torque which must be exerted by pressure upon the finger guard 11 during a static release.

The present invention is, of course, in no way restricted to the specific disclosure of the specification and drawings, but also encompasses any modifications within the scope of the appended claims.

What we claim is:

1. A portable motor chain saw, comprising in combination:
   a motor housing including a handle housing portion;
   a safety braking device, associated with said motor housing, for protecting against recoil movements;
   a handle mounted to said handle housing portion of said motor housing;
   a hand guard associated with said braking device for actuating same, said hand guard acting as an inertia mass and being arranged between said handle and the saw chain, said hand guard being pivotally journalled about an axis extending substantially parallel to the drive axis of said saw;
   damping elements mounted relative to said motor housing both to damp unavoidable vibrations and for supporting said handle relative thereto for attaining an inertia magnitude by utilization of recoil;
   an arresting device rigidly connected to said handle and engaging said hand guard in such a way that it is releasable under the influence of a relative movement due to the inertia magnitude of said motor housing with respect to said handle, caused by a recoil, consequently releasing said hand guard for pivotal movement only upon exceeding a predetermined value of recoil.

2. A chain saw in combination according to claim 1, in which said arresting device includes an abutment surface extending substantially transverse to said recoil movement, and which includes a projection connected to said hand guard and directed against said abutment surface, said projection and said abutment surface being adapted to cooperate with one another.

3. A chain saw in combination according to claim 2, in which at least one of said abutment surface and said projection are embodied in a spring-elastic manner.

4. A chain saw in combination according to claim 3, in which said arresting device is a leafspring, said abutment surface being bent off therefrom.

5. A chain saw in combination according to claim 4, in which said hand guard includes a carrier, and in which said projection comprises an abutment pin which extends parallel to the turning axis of said hand guard and is secured to said carrier.

6. A portable motor chain saw, comprising:
   a motor housing including a handle housing portion;
   a safety braking device, associated with said motor housing, for protecting against recoil movements;
   a handle mounted to said handle housing portion;
   a hand guard associated with said braking device for actuating same, said hand guard acting as an inertia mass and being arranged between said handle and the saw chain, said hand guard being pivotally journalled about an axis extending substantially parallel to the drive axis of said saw;
   damping elements mounted to said motor housing for supporting said handle relative thereto;
   an arresting device connected to said handle and engaging said hand guard in such a way that it is releasable under the influence of a relative movement, of said motor housing with respect to said handle, caused by a recoil, consequently releasing said hand guard,
   said arresting device including an abutment surface extending substantially transverse to said recoil movement, a projection connected to said hand guard and directed against said abutment surface, said projection and said abutment surface being adapted to cooperate with one another, at least one of said abutment surface and said projection being embodied in a spring-elastic manner, said arresting device being a leafspring, said abutment surface being bent off therefrom, said hand guard including a carrier, said projection comprising an abutment pin which extends parallel to the turning axis of said hand guard and being secured to said carrier, said carrier of said abutment pin being spring-elastic, said leafspring having two end sections, that end section serving for connection of said leafspring with said handle being provided with elongated slots which serve for the adjustment of the position of said abutment surface relative to said abutment pin, and for the adjustment of the spring loading of the other free end section of said leafspring.

7. A chain saw in combination according to claim 6, in which said carrier is rubber elastic.

8. A chain saw according to claim 6, in which said leafspring, viewed in a direction toward the free end section thereof, includes a roof-shaped intermediate zone adjacent said abutment surface, and a downwardly inclined back surface adjacent said roof-shaped intermediate zone, said projection being adapted to glide along said back surface under tension of said leafspring during pivoting back of said hand guard out of the braking release position into the non-braking ready position.

9. A chain saw according to claim 8, in which said handle housing portion of said motor housing is a separate piece, and which includes damping elements for supporting said handle housing piece relative to said motor housing.

* * * * *